Aug. 14, 1962

C. J. WHEELER 3,048,920

TOOL FOR PARTING ELONGATED FRACTURABLE MEMBERS

Filed July 9, 1959

INVENTOR.
CHARLES J. WHEELER
BY
Hoodling and Krost
ATTORNEYS

C. J. WHEELER 3,048,920

TOOL FOR PARTING ELONGATED FRACTURABLE MEMBERS

Filed July 9, 1959

INVENTOR.
CHARLES J. WHEELER

BY
Shoadling and Krost

ATTORNEYS

Aug. 14, 1962    C. J. WHEELER    3,048,920
TOOL FOR PARTING ELONGATED FRACTURABLE MEMBERS
Filed July 9, 1959    6 Sheets-Sheet 4

INVENTOR.
CHARLES J. WHEELER
BY
Shoodling and Krost
ATTORNEYS

Aug. 14, 1962  C. J. WHEELER  3,048,920
TOOL FOR PARTING ELONGATED FRACTURABLE MEMBERS
Filed July 9, 1959  6 Sheets-Sheet 5

INVENTOR
CHARLES J. WHEELER
BY
*Kraodling and Kost*
ATTORNEYS

United States Patent Office 3,048,920
Patented Aug. 14, 1962

3,048,920
TOOL FOR PARTING ELONGATED
FRACTURABLE MEMBERS
Charles J. Wheeler, R.D. 4, Box 310, Chardon, Ohio
Filed July 9, 1959, Ser. No. 825,907
2 Claims. (Cl. 30—92)

This invention relates generally to a tool for parting elongated fracturable members and more particularly to a tool having a pair of manually operable handles for actuating the jaws which tension-squeeze a flexible and substantially non-extensible chain wrapped around the fracturable member until it is parted or fractured.

When actuating the pair of manually operable handles of a parting tool, the operator, even though he is braced or prepared for it, cannot fully prevent the pair of handles from quickly collapsing in a closing direction at the instant that the fracture occurs, with the result that the side shoulders of the links are apt to crush and damage the parted end portion of the fracturable member, unless the operator can quickly move the tool sideways whereby the side shoulders clear the parted end portion before the handles close together. Prior to the fracture the operator is normally exerting a tremendous load on the handles and when the fracture occurs the handles suddenly collapse towards a closed position under the force of the operator and if the side shoulders of the chains were allowed to engage the outer surface of the parted end of the pipe, the chain may crush the pipe and damage same. In actual operation, the sudden collapsing of the handles do not occur when the handles are spread apart more than 90 degrees, because when the handles are wider than 90 degrees, the operator can normally arrest the movement of the handles rather quickly and thus stop the jaw movement short and thereby preclude the side shoulders from damaging the parted end of the pipe. It is when the fracture occurs with the handles less than 80 degrees apart, that the operator is usually unprepared to prevent a quick arrest of the movement of the handles to avoid damaging of the pipe.

An object of the invention is the provision in a parting tool having a pair of manually operable handles whereby the jaws of the tool may be so operated, particularly in a handle range of from 80 to closed position, that the travel of the jaws is minimized whereby the side shoulders of the chain link may be precluded from engaging the outer peripheral surface of the parted end of the fracturable member.

Another object of the invention is the provision of the parting tool having a pair of manually operable handles having adjustment means whereby the operator may set the position of the jaws whereby the side shoulders of the chain link may engage the outer peripheral surface of the fracturable member to aid in parting the fracturable member.

Another object of the invention is the provision in a parting tool having a pair of manually operable handles wherein the jaws have four operating positions and wherein the travel between one operating position to the next is less than the chain link.

Another object of the invention is the provision of a parting tool having a pair of manually operable handles wherein the jaws have four operating positions; namely, a maximum jaw position, a minimum jaw position, and first and second intermediate jaw positions.

Another object of the invention is the provision of a parting tool having a pair of manually operable handles wherein the maximum jaw position is more than one and less than three links wide.

Another object of the invention is the provision of a parting tool wherein the cutting elements in the minimum jaw position are less than one chain link apart.

Another object of the invention is the provision of a parting tool wherein the cutting elements in the minimum jaw position overlap each other.

Another object of the invention is to limit the distance between the adjacent cutting edges of the rotary cutting means at the joined ends of the chain to a low value in order to prevent a jagged or irregular "break" occurring between the joined ends of the chain.

Another object of the invention is the provision of a parting tool wherein the two end cutter means engaged by the jaws may move transversely relative to each other and subject the fracturable member being parted to the transverse separating force as well as to a penetrating force.

Another object of the invention is the provision of a chain wherein the length of a chain link is less than the diameter of a rotary cutting means plus the penetratable distance multiplied by $2\pi$ and wherein the distance between the cutting edges of adjacent rotary cutting means is less than the penetratable distance.

Another object is the provision of a parting tool wherein the travel of the jaw effected by the adjustment means is less when the handles are spread wide than when the handles are closed.

Another object is the provision of a parting tool wherein the rate of travel for the jaw per unit degree of handle movement is greater for a minimum adjustment setting than for a maximum adjustment setting.

Other objects and a fuller understanding of the invention may be had by referring to the following description and claims, taken in conjunction with the accompanying drawing, in which:

While not limited thereto, the invention is particularly useful in parting or cutting elongated fracturable members, such as cast iron pipe, cast iron soil pipe, AWWA water main pipe, tile chimney flue liners, clay pipe, concrete pipe, terra cotta pipe, transite pipe, whether of circular, oval or other cross-sectional shape. The cutter is likewise capable of cutting glass tubing and rods.

Figures 1, 9:
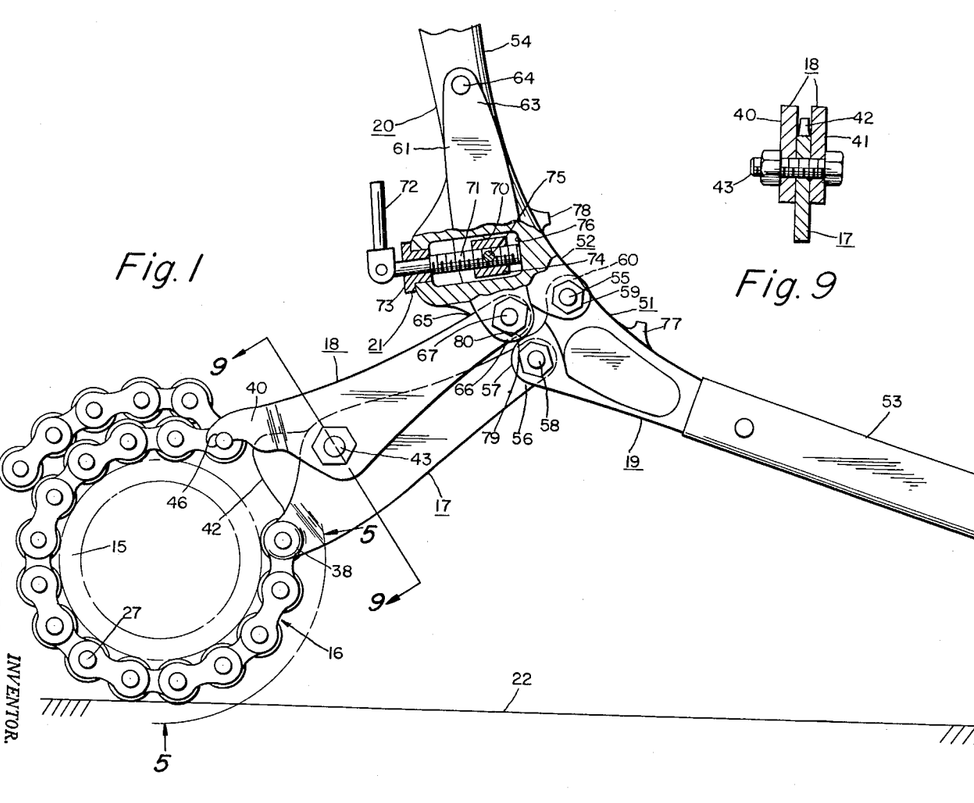
FIGURE 1 is a side view of a parting tool, at substantially ⅗ scale, having a pair of manually operable handles and is shown with the jaws in the maximum jaw position being one of the operating positions of the tool, with parts of the tool being broken away to illustrate some of the internal features.
FIGURE 9 is a cross-sectional view taken along the line 9—9 of FIGURE 1.

The parting tool with sufficient length of chain is useful in cutting or parting 2″ thru 6″ standard or extra heavy soil pipe
2″ thru 15″ glazed tile
2″ thru 6″ acid proof pipe
2″ thru 6″ asbestos cement pipe, round or oval
2″ thru 18″ tile or terra cotta
2″ thru 8″ transite sewer or vent pipe
2″ thru 6″ corrosion resistant pipe
2″ thru 8″ Duriron
Chimney flue liners, square or round
6″ transite pressure pipe In FIGURE 1, the fracturable member or pipe is indicated by the reference character 15 and may comprise any one of the pipes mentioned above. The parting tool comprises a chain 16, a first jaw element means 17, a second jaw element means 18, a first handle element means 19, and a second handle element means 20. The tool is also provided with an adjustment assembly indicated generally by the reference character 21. In FIGURE 1, the line 22 indicates generally the floor or the ground upon which the tool is operated with the chain around the pipe and the lower handle engaging the floor or ground, although it is to be understood that the tool may be operated off of the ground with pressure applied to the pair of handles by the two arms of the operator.

Figure 5:
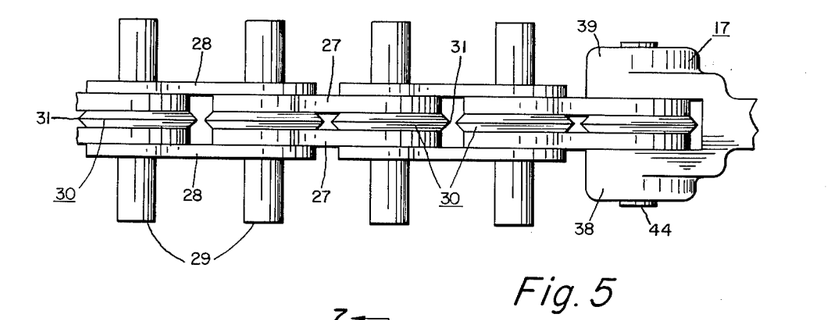
FIGURE 5 is a view principally of cutter chain, at full scale, taken along the line 5—5 of FIGURE 1.
Figure 6:
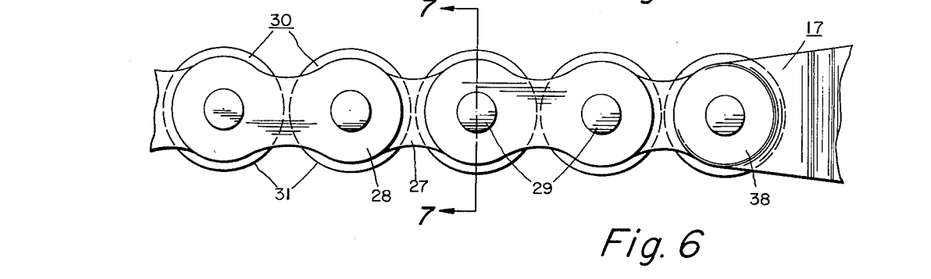
FIGURE 6 is a side view of the chain in FIGURE 5.
Figure 7:
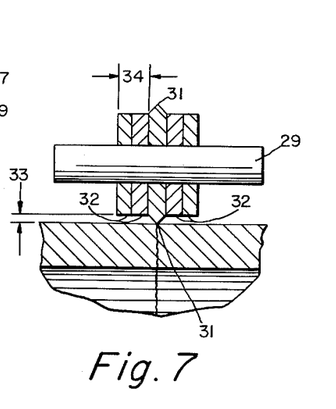
FIGURE 7 is a cross-sectional view, at full scale, taken along the line 7—7 of FIGURE 6 and shows principally the cutting edge of the tool and the side shoulders of the chain links.

The chain 16 is preferably flexible and is substantially non-extensible and is adapted to be wrapped around and tension-squeeze the pipe 15 to fracture or part same without substantial relative rotation or oscillation thereabout. The fracture will occur substantially perpendicular to the longitudinal axis of the pipe. The chain 16 comprises a plurality of inside links 27 and a plurality of outside links 28 connected together by transverse pins 29. Mounted between the inside links 27 are a plurality of cutting means 30 which are preferably circular and have sharp cutting edges 31, see FIGURE 5, which is drawn to full-scale. The side links 27 and 28 have side shoulders 32 beyond which the cutting edge 31 extends for cutting into the outer peripheral surface of the pipe to be parted. The distance 33 in FIGURE 7 represents the penetratable distance that the cutting edges 31 may extend into the fracturable member before the side shoulders 32 may engage the outer peripheral surface of the parted pipe. The distance 34 represents the total width of the side shoulders. In actual practice, a specific chain suitable for the parting tool may have the following dimensions: diameter of circular cutting means $1\frac{3}{16}$ inches, the diameter of the transverse pins $\frac{3}{8}$ inch, and the length of the intermediate portion of a chain link $1\frac{1}{4}$ inches measured from the axial center of one transverse pin to the axial center of the next adjacent transverse pin. The penetratable distance 33 is $\frac{3}{32}$ of an inch and the width 34 of the side shoulders is $\frac{5}{16}$ of an inch. The ends of the chain may be drawn together a predetermined amount; namely, equal to the penetratable distance multiplied by $2\pi$ before the side shoulders engage the outer surface of the pipe being parted. With the figures set forth above the predetermined amount or distance is equal to $\frac{3}{32}$ times $2\pi$ or approximately $\frac{19}{32}$ of an inch.

The first and second jaw means 17 and 18 have a jaw pivot means 43 and are arranged to be actuated respectively by the handle means 19 and 20. The first jaw means 17 has forked lugs 38 and 39 through which a pin 44 passes for engaging the end of the chain; see FIGURE 5. This chain engagement connection in the claims is referred to as first chain engaging means. The second jaw means 18 comprises two side plates 40 and 41, see FIGURE 9, which is a cross-section taken along the line 9—9 of FIGURE 1. The first jaw means 17 is provided with a tongue 42 which fits between the two side plates 40 and 41 and prevents the chain from becoming lodged between the two jaw means. The two side plates 40 and 41 are provided respectively with semi-circular hooks 46 and 47 for engaging a selectable transverse pin depending upon the size of the pipe member to be fractured. The semi-circular depth of the hooks 46 and 47 may be approximately $\frac{3}{16}$ of an inch. In the claims, the hooks 46 and 47 are characterized as second chain engaging means.

Figure 2:
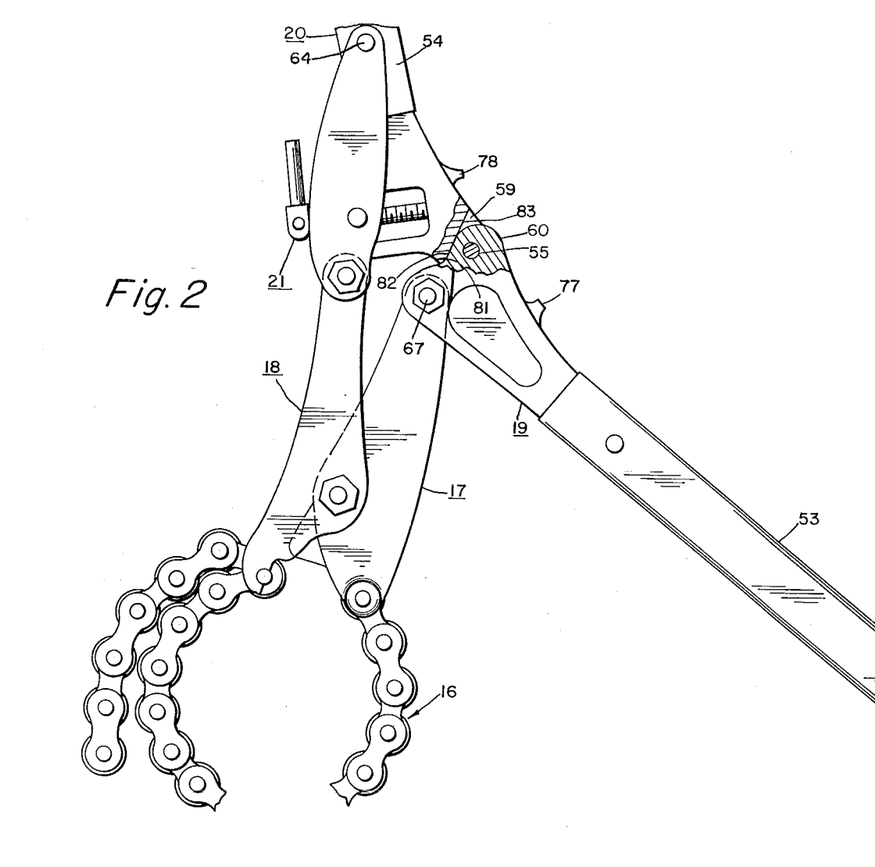
FIGURE 2 is a view of the tool with the jaws in a first intermediate position being a second operating position of the tool.
Figure 3:
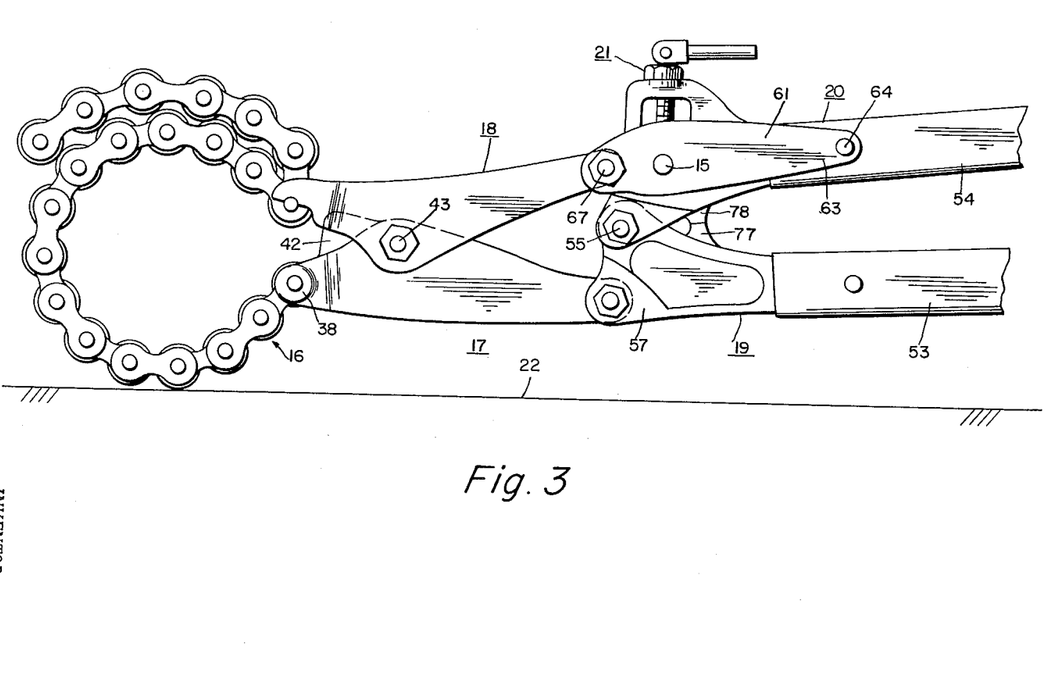
FIGURE 3 is a side view of the tool with the jaws in a second intermediate position being a third operating position of the tool.
Figure 4:
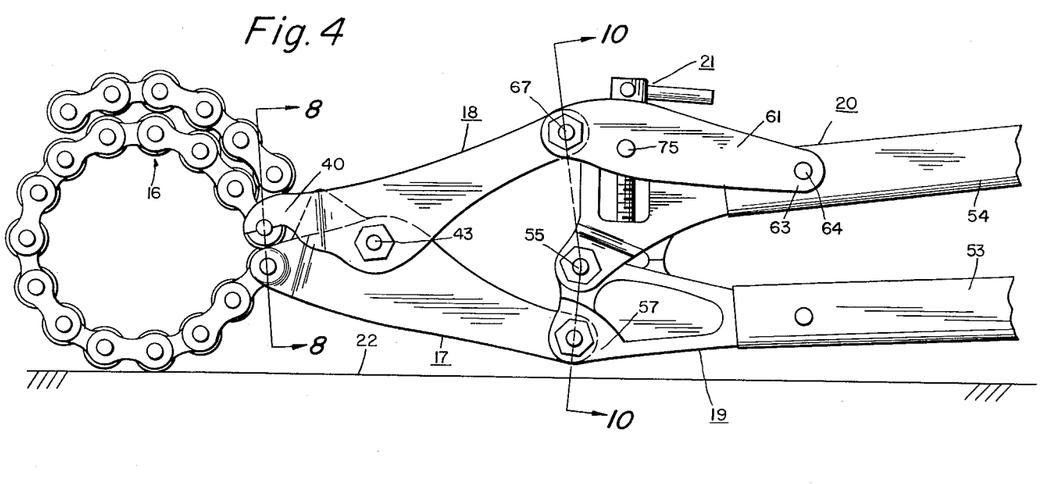
FIGURE 4 is a side view of the tool with the jaws in their minimum jaw position being a fourth operating position of the tool.

The first handle means 19 is provided with a handle pivot portion 51 comprising a tongue 60 and the second handle means 20 is provided with a handle pivot portion 52 comprising spaced lugs 59 between which the tongue 60 is mounted. These handle pivot portions 51 and 52 are pivotally connected together by handle pivot means 55 passing through the lugs 59 and the tongue 60. The first and second handle means 19 and 20 have respectively manually operable handles 53 and 54 which have a closed position and first and second open positions. In FIGURE 1, the handles 53 and 54 are shown in a first open position which is substantially 120 degrees and in FIGURE 2 the handles are shown in a second open position at substantially 140 degrees. The FIGURES 3 and 4 show the handles in a closed position. The first handle means 19 has a jaw-handle pivot portion 57 comprising lugs through which a jaw-handle pivot means 58 extends for engaging the rearward end 56 of the first jaw means 17. The second handle means 20 is provided with a pair of adjustment arms 61 and 62 mounted on opposite side of the handle 54. The adjustment arms 61 and 62 have at the rearward end thereof arm-handle pivot portions 63 pivotally connected to the handle 54 by means of an arm-handle pivot 64. The opposite or forward ends of the adjustment arms 61 and 62 are provided with jaw-arm pivot portions 66 through which extend a jaw-arm pivot means 67 for connecting the rearward end 65 of the second jaw means 18 thereto.

The second handle means 20 is provided with an open window 70 in which is mounted an adjustment screw 71 arranged to be operated by a lever 72. The adjustment screw 71 is held in the window 70 by means of a cap nut 73. A travel nut 74 is arranged to move up-and-down in the window 70 as the adjustment screw is turned. The travel nut 74 carries a set of pins 75 which engage respectively the adjustment arms 61 and 62. The bottom end of the adjustment screw 71 engages an engagement surface 76 whereby as the adjustment screw is turned, the adjustment arms 61 and 62 are moved relative to the second handle means 20 for moving the jaw-means relative to each other without movement of the handles. The adjustment means or arrangement is indicated by the reference character 21 and the adjustment arms 61 and 62 may be moved between a minimum and a maximum adjustment position. The maximum position of the adjustment assembly is when the jaws that engage the chain are in their maximum jaw position and the minimum position of the adjustment assembly is when the jaws are in their minimum jaw position. In other words, the adjustment assembly is shown in its maximum adjustment position in FIGURE 1 and is shown in its minimum adjustment position in FIGURE 2.

The first and second handle means 19 and 20 are provided respectively with stops 77 and 78 which define the closed position of the handles. The handles in FIGURE 1 are in a first open position and the stops for the handles in this position are provided by the surfaces 79 and 80 on the jaw-handle pivot portion 57 and the jaw-arm pivot portion 66. In other words, when the jaw-handle pivot portions 57 and the jaw-handle pivot portion 66 engage each other, it is this engagement that constitutes the stop surfaces 79 and 80 for limiting the open position of the handles in the first open position at about 120 degrees. The stops for limiting the open positions of the handles in FIGURE 2 is provided by the stop surfaces 81 and 82 which engage each other. The stop surfaces 81 and 82 as shown in FIGURE 2, comprise engagement surfaces on the tongue 60 and on a shoulder 83 between the handle lugs 59. These stop surfaces 81 and 82 engage each other when the handles are spread to the second open position at about 140 degrees.

The jaw-handle pivot means 58 and the jaw-arm pivot means 67 with the handles 53 and 54 in an open position are spaced apart a distance constituting the base of two common triangles with said jaw-pivot means 43 constituting the apex of one of said common triangles and with said handle pivot means 55 constituting the apex of the other common triangle. These pivot means define pivot points of first, second and third leverage systems. The first leverage system has as pivot points, said handle pivot means 55, said jaw-pivot means 43 and said jaw-handle pivot means 58. The second leverage system has as pivot points, said handle-pivot means 55, said jaw-pivot means 43 and said jaw-arm pivot means 67. The third leverage system has as pivot points, said jaw-handle pivot means 58, said jaw-arm pivot means 67, and said handle pivot means 55.

Figure 11:
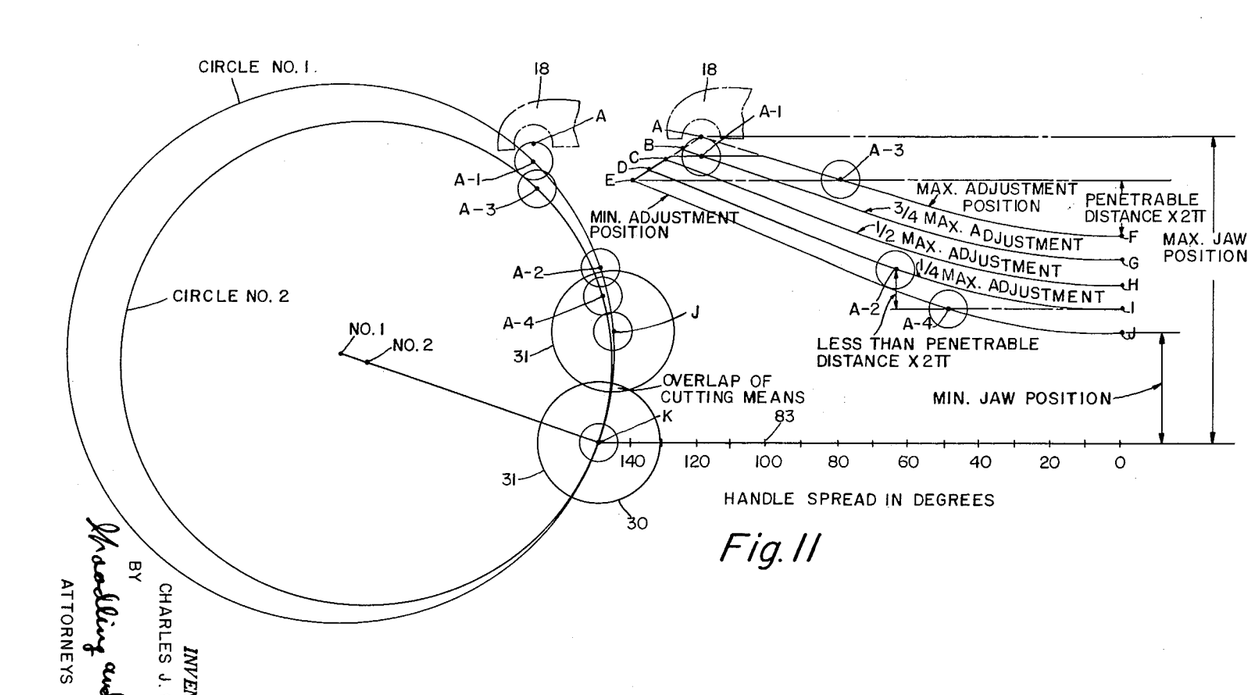
FIGURE 11 is a diagram showing the four limit positions of the tool and other operating aspects of the movement of the jaws with respect to the angular positions of the pair of manually operable handles.

The jaw means have at least first, second, third and fourth operating positions between which they may be actuated by the handles. In the first operating position, the handles are open to the first open position at approximately 120 degrees (FIGURE 1) and the adjustment means is in its maximum adjustment position. The first and said selectable transverse pin means engaged by the chain engaging means or hooks 46 and 47 are spaced a maximum jaw position apart in the first operating position and this position is shown by the reference points K and A–1 on the large circle No. 1 in FIGURE 11. The reference line 83 passes through the point K and is divided into degrees and constitutes the base line for the system of curves representing the travel of the jaws as their handles are moved from 140 degrees to closed position. The FIGURE 11 is drawn to full scale.

For a specific tool embodying the present invention, the maximum jaw position whereby the selectable transverse pin A–1 may be engaged by the hooks 46 and 47 is 2⅞ inches, allowing 3/16 inch for the depth of the semi-circular hooks 46 and 47. The large circle in FIGURE 11 represents a line passing through the axial centers of the transverse pin means for a pipe, and the point K represents the actual position of the first transverse pin means which extends through the fork ends 38 and 39. The point A–1 on the circle represents the actual position of the selectable transverse pin of the chain. The point A represents the center of the semi-circular hooks 46 and 47. The lines A—F represent the relative travel of the first and selectable pin means with the adjusting means set at the maximum adjustment position as the handles are moved from open position to closed position. Similarly the lines B—G, the lines C—H, the lines D—I and the lines E—J represent the relative travel of the first and selectable pin means as the handles are moved from open position to closed position for three-quarter maximum adjustment position, for one-half maximum adjustment position, and one-quarter maximum adjustment position and for minimum adjustment position, respectively. The vertical distance between the reference line 83 and the point J represents the minimum jaw position. The circles 31 surrounding the points K and J represent the cutting edges when the selectable transverse pin is at the minimum jaw position and the amount that the circles 31 overlap represent the amount that the cutting edges overlap each other when the jaws are in their minimum jaw position.

Figure 10:
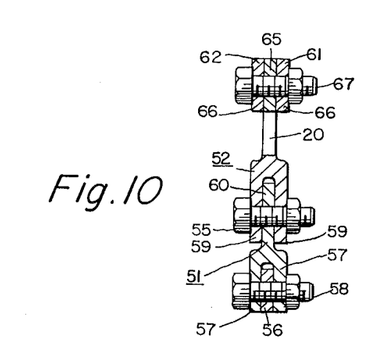
FIGURE 10 is a cross-sectional view taken along the line 10—10 of FIGURE 4.

Depending on the size of the pipe to be parted, the point A–1 may fall any place between the maximum jaw position and the minimum jaw position. The point A–1 in the FIGURE 10 has been selected at a point whereby the selectable transverse pin may just clear the hooks 46 and 47 representing the maximum spread of the traverse pins which may still be engaged by the jaws, but in actual practice, the operator would not use the transverse pin at A–1 because the side shoulders of the links would be apt to crush or damage the fracturable member. To avoid the crushing action, the operator would engage the transverse pin at the point A–2 on circle No. 1, which represents the location of the next transverse pin to be engaged by the jaws. By engaging the transverse pin at the point A–2, then the amount of relative travel of the transverse pin K and A–2 by the complete closing of the handles would be represented by the vertical distance that the point A–2 on the curve D—I is above the point I. To engage the transverse pin at A–2, the adjustment means would be set at one-quarter maximum position because if the adjustment means were set at either one-half maximum adjustment or three-fourths maximum adjustment, then the chain would not squeeze the pipe even though the handles were completely closed, and if the adjustment means were set at a minimum adjustment position, then the hook 18 would not be open wide enough to clear the transverse pin at A–2, then the squeeze on the pipe would begin at approximately 65 degrees and extend until the handles were closed at the point I, with the adjustment means set at one-quarter maximum position. The vertical distance that the point A–2 is above the point I in FIGURE 11 is approximately ⅜ of an inch which is the amount that the first and said selectable transverse pin means are drawn together as the handles move from approximately 65 degrees to the closed position. The vertical distance between A–2 and I is less than the penetratable distance of 3/32 of an inch times $2\pi$, with the result that the side shoulders of the links are precluded from crushing or damaging the parting pipe by the sudden collapsing of the handles at the instant of the fracture.

If the pin at A–1 were selected, then the amount that the transverse pins K and A–1 would be drawn together would be represented by the vertical distance that the point A–1 on the curve B—G is above the point G.

The second operating position is shown in FIGURE 2, and the handles are open to a second open position at substantially 140 degrees and the adjustment means is in the minimum adjustment position. The first and second selectable transverse pin means engaged by the engaging means are spaced apart at a first intermediate jaw position; namely, 2⅝ inches, which is indicated by the reference point E and is closer to the reference line 83 than the reference point A.

The third operating position is shown in FIGURE 3 and in this position, the handles are closed and the adjustment means is in its maximum adjustable position. The first and said selectable transverse pin means engaged by the chain engaging means or hooks 46 and 47 are spaced apart at a second intermediate jaw position; namely, 2 1/16 inches, which is indicated by the reference point F in FIGURE 11. The transverse pin means in said second intermediate jaw position are closer together than they are in the first intermediate jaw position.

Figure 8:
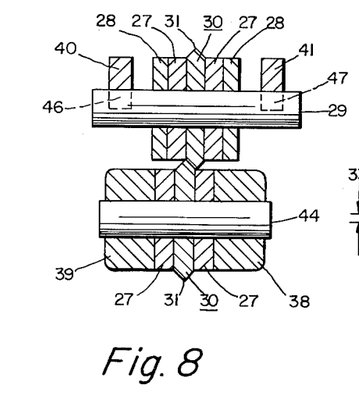
FIGURE 8 is a view, at full scale, taken along the line 8—8 of FIGURE 4 and shows principally the overlapping position of the cutter means at the ends of the chain.

The fourth operating position is shown in FIGURE 4 and in this position, the handles are closed and the adjustment means is in its minimum adjustment position. The first and said selectable transverse pin means engaged by the chain engaging means or the hooks 46 and 47 are spaced at a minimum jaw position apart; namely, 1⅛ inches which is indicated by the reference point J. The transverse pin means in the minimum jaw position are closer together than they are in the second intermediate jaw position and are spaced apart 1⅛ inches which is less than a chain link measured from the axial center of one transverse chain means to the axial center of the next transverse pin means. This means that the cutting means overlap each other and is the position shown in FIGURE 8 of the drawings and the lugs 40 and 41 are wide enough apart to allow the selectable pin to move sideways. The rotary cutting edge 31 is defined by converging sides preferably having an included angle therebetween of about 90 degrees, whereby the sides of the rotary cutting means overlap each other as these two cutters are brought closer together. As the overlapping takes place, the sharp cutting edges 31 move transversely with respect to each other and subject the pipe being cut to transverse stress as well as to a penetrating stress and aids in initiating the fracture of the pipe.

In the chart of FIGURE 11, the line A—F represents the movement of the jaws relative to each other for the respective degrees of the handle openings with the adjustment means set at maximum adjustment position, and the line E—J represents the relative movement of the jaws as the handles are moved through the respective angles with the adjustment means set at the minimum adjustment position. The slope of the line E—J is greater than the slope of the line A—F above 30 degrees. The travel of the jaws effected by the adjustment means is less when the handles are spread wide than when the handles are closed. The rate of travel of the jaws per unit degree of handle movement is greater for a minimum adjustment setting than for a maximum adjustment setting. The movement of the jaws below 30 degrees is through a very small range as this is the region where the maximum amount of force may be transmitted for squeezing the chain about the pipe for parting same. The travel of the jaw between said first and second intermediate position is about the same as the penetratable distance of the tool multiplied by $2\pi$, and the movement of the jaws between said first intermediate jaw position and said minimum jaw position is greater than the penetratable distance multiplied by $2\pi$. The maximum jaw position is more than one and less than three chain links apart. The distance that the jaws move from A to E is less than one chain link and the distance that the jaws move between E and F is less than one chain link and the distance that the jaws move between F and J is less than one chain link. With this arrangement, the tool for all practical purposes may be set so that the movement of the jaws is precluded from squeezing the chain to an amount where the side shoulders 32 may engage the outer peripheral surface of the pipe at the instant that the fracture occurs.

In actual operation, the sudden collapsing of the handles do not occur when the handles are spread apart more than 90 degrees, because when the handles are wider than 90 degrees, the operator can normally arrest the movement of the handles rather quickly and thus stop the jaw movement short and thereby preclude the side shoulders from damaging the parted end of the pipe. It is when the fracture occurs with the handles less than 80 degrees apart, that the operator is usually unprepared to prevent a quick arrest of the movement of the handles to avoid damaging of the pipe. In actual operation, the sudden collapsing of the handles may not normally exceed a range of 20 degres before the operator can bring the handles to an arresting position.

If a selectable pin falls at the point A–3, on the circle No. 2 (representing the different size pipe), where the handles are spread 80 degrees apart and with the adjustment means set a maximum position, then the next adjacent pin would fall at the point A–4 on circle No. 2, which point is one-link in vertical distance below A–3. The chain would not begin to squeeze at A–4 until the handles were closed to 50 degrees. If the operator selected the pin A–3, then the amount that the pins K and A–3 would be drawn together by closing the handles from 80 degrees to closed position is represented by the vertical distance between the point A–3 and F. This distance is approximately $9/16$ inch and equal to the penetratable distance multiplied by $2\pi$. The fracture would of course occur some place between A–3 and F which means that the side shoulders would not engage the parted pipe to damage same. If the operator selected the point A–4, then the amount that the pins K and A–4 would be drawn together by the handles moving from 50 degrees to closed position would be represented by the vertical distance between the points A–4 and J which is approximately ¼ inch and is less than the penetratable distance multiplied by $2\pi$. Accordingly, any selectable pin falling between the point A–3 and A–4 is free from the standpoint of the side shoulders of the chain damaging the parted pipe. This means that any selectable pin which falls on the curves less than 80 degrees is free and includes any position between the points A–3 and A–4. The only place which is not free is between the points A–1 and A–3 which is a distance of approximately ¼ inch and ordinarily this is about the amount of slack in the chain that is required to fasten the selectable pin in the hooks 46 and 47. For all practical purposes the tool as described is free from damaging the parted pipe after the fracture occurs.

The length of a chain-link is less than the diameter of a rotary cutting means plus the penetratable distance multiplied by $2\pi$ and the distance between the cutting edges of adjacent rotary cutting means is less than the penetratable distance.

In some instances it may be desirable for the operator to set the jaws so that the side shoulders of the chain may engage the pipe prior to fracture in order to aid in fracturing the pipe or for other reasons. That is to say, the end cutting means engaged by the jaws usually cut deeper than the other cutting means before fracture occurs. The end cutting means may have reached their full penetration and it may then become desirable that the side shoulders at the end cutting means engage the pipe in order to aid in parting the pipe. This, may be illustrated by selecting the point A–3 as an example. In this example, the operator would turn the adjustment means to minimum adjustment position and open the handles to 140 degrees. The point A–3 now rests on the point E. The closing of the handles from 140 degrees to zero would move the pins K and A–3 relative to each other for a vertical distance of 1½ inches from E to J. This distance is greater than the penetratable distance multiplied by $2\pi$. Thus, the tool may be set whereby the side shoulders may engage the pipe for any useful purpose.

In operation, the operator can well judge when the handles are spread apart about 80 degrees as this is slightly less than 90 degrees, a right angle. A pin is selected which can normally be hooked when the handles are in the neighborhood of 90 degrees and by the time that the slack of the chain is taken up, either by turning the adjustment means or moving the handles, the chain will begin to squeeze when the handles are at about 80 degrees or less depending on the particular size of the pipe to be parted. As the handles are drawn together the tool is working in the power range where the curves begin to flatten, and where the jaw travel, after the fracture, is insufficient to draw the side shoulders against the parted pipe and damage same.

In the present invention the distance between the adjacent cutting edges of the rotary cutting means at the joined end of the chain is at a low value in order to prevent a jagged or irregular "break" occurring between the joined ends of the chain. It has been found that if the cutting edges of the rotary cutting means mounted on the first and the selectable pin means engaged by the chain engaging means are too far apart, then the "break" may become jagged or irregular. The combination of the jaw means, the handle means and the adjustment means comprise apparatus to limit this distance to a minimum value. In the present invention, this distance between the adjacent cutting edges of the rotary cutting means mounted on the first and the selectable pin means engaged by the pin engaging means is at a value less than the diameter of the rotary cutting means plus the penetrating distance multiplied by $2\pi$ when the handle means are spaced apart as much as 80 degrees. In other words, the distance between the cutting edges between the point A–3 and the point K (17/16 inch) is less than the diameter of a rotary cutting means (13/32 inch) plus the penetrating distance multiplied by 2π (19/32) with the handle means spaced apart as much as 80 degrees. Accordingly, when the handles are moved through a range of 80 degrees towards closed position, the "break" is substantially straight between the adjacent cutting edges and not irregular, jagged, or V-shaped, as the case would be if the cutting edges were spread further apart. The combination of the jaw means, the handle means, and the adjustment means comprises apparatus moving said jaw means wherein the space between the cutting edges of the adjacent cutting means, as revealed by the diagram of FIGURE 1, is also less than the diameter of the cutting means plus the penetrating distance multiplied by 2π for a full range operation of the handle means.

Although this invention has been described in the preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cutting tool for parting an elongated fracturable member, said tool comprising a flexible and substantially non-extensible chain adapted to be wrapped around and tension-squeezed against said fracturable member to fracture and part same without substantial relative rotation or oscillation thereabout, said chain comprising a plurality of link means, transverse pin means spaced apart from each other in a direction lengthwise of said chain and interconnecting said link means, rotary cutting means mounted on said transverse pin means and disposed between said link means, said rotary cutting means each having converging sides terminating in a cutting edge, said transverse pin means having a length greater than the lateral width of the link means and having oppositely disposed pin-end portions extending outwardly from said link means, first clamp means having first chain-engaging means thereon to engage said pin-end portions of a first transverse pin means of said chain at a first location, second clamp means having second chain-engaging means thereon to engaged said pin-end portions of a second selectable transverse pin means at a second location of said chain wrapped around said fracturable member, said link means on said first and second transverse pin means constituting respectively first and second terminal link means, said rotary cutting means associated with said first and second terminal link means constituting respectively first and second terminal rotary cutting means, one of said chain-engaging means comprising oppositely disposed spaced portions for engaging said pin-end portions, actuating means connected to said clamp means to draw said chain-engaging means to at least a minimum clamp operating position, said first and said second selectable transverse pin means engaged by said chain-engaging means being positioned apart from each other in said at least minimum clamp operating position for a distance less than the diameter of said rotary cutting means, said oppositely disposed spaced portions of said one of said chain-engaging means being laterally spaced apart for a distance greater than the lateral width of said one of said terminal link means by an amount at least equal to one-half the lateral width of a rotary cutting means and allowing said one of said terminal link means and the terminal rotary cutting means associated therewith to move laterally with respect to said other terminal link means and the terminal rotary cutting means associated therewith in said at least minimum clamp operating position, whereby adjacent converging sides of said first and second terminal rotary cutting means may overlap each other.

2. A cutting tool for parting an elongated fracturable member, said tool comprising a flexible and substantially non-extensible chain adapted to be wrapped around and tension-squeezed against said fracturable member to fracture and part same without substantial relative rotation or oscillation thereabout, said chain comprising a plurality of link means, transverse pin means spaced apart from each other in a direction lengthwise of said chain and interconnecting said link means, rotary cutting means mounted on said transverse pin means and disposed between said link means, said rotary cutting means each having converging sides terminating in a cutting edge, said transverse pin means having a length greater than the lateral width of the link means and having oppositely disposed pin-end portions extending outwardly from said link means, clamp means including first and second jaw means each having first and second end portions and an intermediate portion, means including jaw-pivot means pivotally connecting said intermediate portions together, said first end portion of one of said jaw means having first chain-engaging means thereon to engage said pin-end portions of a first transverse pin means of said chain at a first location, said first end portion of the other said jaw means having a second chain-engaging means thereon to engage said pin-end portions of a second selectable transverse pin means at a second location of said chain wrapped around said fracturable member, first and second handle means each having first and second end portions, said first end portion of said handle means having handle pivot portions, handle pivot means pivotally connecting said handle pivot portions together, said second end portions of said handle means comprising a pair of manually operable handles movable between closed and open positions, said first end portion of said first handle means having a jaw-handle pivot portion, jaw-handle pivot means pivotally connecting said second end portion of said first jaw means to said jaw-handle pivot portion, adjustment arm means having first and second end portions and intermediate portions, said first end portion of said second handle means having an arm-handle pivot portion, arm-handle pivot means pivotally connecting said first end portion of said adjustment arm to said arm-handle pivot portion, said second end portion of said adjustment arm having a jaw-arm pivot portion, jaw-arm pivot means pivotally connecting said second end portion of said second jaw means to said jaw-arm pivot portion, adjustable means movable between a minimum and a maximum adjustment position connected to said intermediate portion of said adjustment arm means and engaging a surface on said first end portion of said second handle means for pivotally actuating said adjustment arm about said arm-handle pivot means to thereby move said jaw-arm pivot means relative to said jaw-handle pivot means with said handles remaining stationary, said link means on said first and second transverse pin means constituting respectively first and second terminal link means, said rotary cutting means associated with said first and second terminal link means constituting respectively first and second terminal rotary cutting means, one of said chain-engaging means comprising oppositely disposed spaced portions for engaging said pin-end portions, the combination of said clamp means and said handle means comprising apparatus to draw said chain-engaging means to at least a minimum clamp operating position, said first and said second selectable transverse pin means engaged by said chain-engaging means being positioned apart from each other in said at least minimum clamp operating position for a distance less than the diameter of said rotary cutting means, said oppositely disposed spaced portions of said one of said chain-engaging means being laterally spaced apart for a distance greater than the lateral width of said one of said terminal link means by an amount at least equal to one-half the lateral width of a rotary cutting means and allowing said one of said terminal link means and the terminal rotary cutting means associated therewith to move laterally with respect to said other terminal link means and the terminal rotary cutting means associated therewith in said at least minimum clamp operating position, whereby adjacent converging sides of said first and second terminal rotary cutting means may overlap each other.

References Cited in the file of this patent

UNITED STATES PATENTS

| | | |
|---|---|---|
| 2,568,280 | Frost | Sept. 18, 1951 |
| 2,685,130 | Tibbetts | Aug. 3, 1954 |
| 2,793,433 | Wheeler | May 28, 1957 |
| 2,798,288 | Wheeler | July 9, 1957 |
| 2,851,773 | Jennison | Sept. 16, 1958 |
| 2,862,295 | Harding et al. | Dec. 2, 1958 |